US012568197B2

(12) United States Patent
Kim et al.

(10) Patent No.: US 12,568,197 B2
(45) Date of Patent: Mar. 3, 2026

(54) LIGHT FIELD DISPLAY APPARATUS

(71) Applicant: Samsung Electronics Co., Ltd., Suwon-si (KR)

(72) Inventors: Daeyeong Kim, Suwon-si (KR); Jaesung Lee, Suwon-si (KR); Youngjin Jo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/737,236

(22) Filed: Jun. 7, 2024

(65) Prior Publication Data

US 2025/0008074 A1      Jan. 2, 2025

Related U.S. Application Data

(63) Continuation of application No. PCT/KR2024/007740, filed on Jun. 5, 2024.

(30) Foreign Application Priority Data

Jun. 29, 2023   (KR) ........................ 10-2023-0084482
Oct. 6, 2023    (KR) ........................ 10-2023-0133772

(51) Int. Cl.
  *H04N 13/31*       (2018.01)
  *H04N 13/128*      (2018.01)
    (Continued)

(52) U.S. Cl.
  CPC ........... *H04N 13/31* (2018.05); *H04N 13/128* (2018.05); *H04N 13/305* (2018.05); *H04N 13/32* (2018.05); *H04N 13/398* (2018.05)

(58) Field of Classification Search
  CPC .... H04N 13/31; H04N 13/128; H04N 13/305; H04N 13/32; H04N 13/398; H04N 13/307
    (Continued)

(56) References Cited

U.S. PATENT DOCUMENTS 6,023,277 A * 2/2000 Osaka ..................... G06F 3/147
                                            348/E13.043
6,061,179 A * 5/2000 Inoguchi ................ H04N 13/32
                                            348/E13.028
    (Continued)

FOREIGN PATENT DOCUMENTS

JP        2010/061066 A     3/2010
JP        2015-215508 A     12/2015
    (Continued)

OTHER PUBLICATIONS

International Search Report dated Sep. 20, 2024, issued in International Application No. PCT/KR2024/007740.
    (Continued)

*Primary Examiner* — Tung T Vo
(74) *Attorney, Agent, or Firm* — Jefferson IP Law, LLP

(57)          ABSTRACT
A light field display apparatus is provided. The light field display apparatus includes a display panel configured to emit light that forms an image, a first lens array which is provided in the display panel and in which a plurality of first lenses are arranged, a second lens array which is arranged spaced apart from the first lens array and in which a plurality of second lenses are arranged, and a barrier arranged in any one place from among between the display panel and the first lens array, between the first lens array and the second lens array, or in front of the second lens array, wherein the barrier has an aperture that transmits the light.

20 Claims, 14 Drawing Sheets

(51) Int. Cl.
  *H04N 13/305* (2018.01)
  *H04N 13/32* (2018.01)
  *H04N 13/398* (2018.01)
(58) Field of Classification Search
  USPC .......................................................... 348/51
  See application file for complete search history.

(56) References Cited

U.S. PATENT DOCUMENTS

| | | | | | |
|---|---|---|---|---|---|
| 6,151,062 | A | * | 11/2000 | Inoguchi ................ | H04N 13/32 |
| | | | | | 348/42 |
| 6,160,527 | A | * | 12/2000 | Morishima ............ | G02B 30/27 |
| | | | | | 348/E13.052 |
| 6,204,967 | B1 | * | 3/2001 | Morishima ............ | H04N 13/31 |
| | | | | | 359/464 |
| 6,215,594 | B1 | * | 4/2001 | Inoguchi .............. | H04N 13/305 |
| | | | | | 348/E13.028 |
| 6,246,451 | B1 | * | 6/2001 | Matsumura ............ | G02B 30/31 |
| | | | | | 348/E13.059 |
| 6,337,721 | B1 | * | 1/2002 | Hamagishi ............. | G02B 30/27 |
| | | | | | 348/E13.05 |
| 6,462,871 | B1 | * | 10/2002 | Morishima ............ | H04N 13/31 |
| | | | | | 348/E13.043 |
| 6,533,420 | B1 | * | 3/2003 | Eichenlaub .......... | H04N 13/349 |
| | | | | | 348/E13.043 |
| 6,940,646 | B2 | * | 9/2005 | Taniguchi .............. | H04N 13/31 |
| | | | | | 359/464 |
| 7,154,675 | B2 | * | 12/2006 | Ishikawa ................ | G02B 30/27 |
| | | | | | 359/619 |
| 7,400,447 | B2 | * | 7/2008 | Sudo ...................... | H04N 13/31 |
| | | | | | 359/464 |
| 7,813,042 | B2 | * | 10/2010 | Mather .................. | G02B 30/31 |
| | | | | | 348/42 |
| 7,944,465 | B2 | * | 5/2011 | Goulanian .......... | H04N 13/305 |
| | | | | | 348/51 |
| 7,986,375 | B2 | | 7/2011 | Krijn et al. | |
| 8,870,380 | B2 | * | 10/2014 | Huang ................. | H04N 13/315 |
| | | | | | 353/38 |
| 9,055,288 | B2 | * | 6/2015 | Goulanian ............... | G09G 3/22 |
| 9,076,359 | B2 | * | 7/2015 | Zerrouk ............... | H04N 13/305 |
| 9,507,160 | B2 | * | 11/2016 | Cho ...................... | G09G 3/3674 |
| 10,061,135 | B2 | | 8/2018 | Kim et al. | |
| 10,070,106 | B2 | | 9/2018 | Ferri et al. | |
| 10,451,887 | B2 | | 10/2019 | Bui | |
| 10,466,537 | B2 | * | 11/2019 | Kamada .................. | G02B 5/045 |
| 10,663,776 | B1 | * | 5/2020 | Hopkin ................ | G02B 6/0031 |
| 10,778,962 | B2 | * | 9/2020 | Ng ........................ | H04N 13/398 |
| 10,838,359 | B2 | | 11/2020 | Shestak et al. | |
| 10,931,937 | B2 | * | 2/2021 | Li ......................... | H04N 13/344 |
| 11,579,520 | B2 | | 2/2023 | Whitehead et al. | |
| 2002/0021492 | A1 | * | 2/2002 | Morishima ............ | H04N 13/31 |
| | | | | | 348/E13.043 |
| 2002/0054430 | A1 | * | 5/2002 | Takikawa .............. | H04N 13/359 |
| | | | | | 348/E13.043 |
| 2002/0113866 | A1 | * | 8/2002 | Taniguchi ............ | H04N 13/361 |
| | | | | | 348/E13.028 |
| 2002/0118452 | A1 | * | 8/2002 | Taniguchi .............. | H04N 13/31 |
| | | | | | 348/E13.059 |
| 2003/0107805 | A1 | * | 6/2003 | Street ..................... | G02B 30/27 |
| | | | | | 359/464 |

| | | | | | |
|---|---|---|---|---|---|
| 2005/0111100 | A1 | * | 5/2005 | Mather ................ | H04N 13/359 |
| | | | | | 359/464 |
| 2006/0152812 | A1 | * | 7/2006 | Woodgate ............ | H04N 13/305 |
| | | | | | 359/619 |
| 2006/0176541 | A1 | * | 8/2006 | Woodgate ............ | H04N 13/305 |
| | | | | | 359/237 |
| 2006/0202910 | A1 | * | 9/2006 | Cha ........................ | G02B 3/005 |
| | | | | | 345/6 |
| 2007/0008617 | A1 | * | 1/2007 | Shestak ................ | H04N 13/359 |
| | | | | | 359/455 |
| 2007/0165145 | A1 | * | 7/2007 | Sugiyama ............ | H04N 13/351 |
| | | | | | 349/65 |
| 2009/0257119 | A1 | * | 10/2009 | Uehara ............. | G02F 1/133526 |
| | | | | | 359/463 |
| 2013/0027909 | A1 | * | 1/2013 | Kim ...................... | H04N 13/373 |
| | | | | | 362/97.1 |
| 2013/0235005 | A1 | * | 9/2013 | Ohyama .............. | H04N 13/378 |
| | | | | | 345/204 |
| 2013/0249896 | A1 | * | 9/2013 | Hamagishi ........... | H04N 13/354 |
| | | | | | 345/204 |
| 2013/0265508 | A1 | * | 10/2013 | Kim .................... | G02F 1/13471 |
| | | | | | 349/182 |
| 2013/0307948 | A1 | * | 11/2013 | Odake .................. | H04N 13/305 |
| | | | | | 348/59 |
| 2014/0022619 | A1 | * | 1/2014 | Woodgate .......... | G02B 27/0093 |
| | | | | | 359/240 |
| 2014/0022635 | A1 | * | 1/2014 | Wu ........................ | G02B 30/27 |
| | | | | | 359/463 |
| 2014/0092329 | A1 | * | 4/2014 | Odake .................. | H04N 13/305 |
| | | | | | 349/15 |
| 2015/0268478 | A1 | * | 9/2015 | Kim ...................... | G02F 1/1347 |
| | | | | | 349/15 |
| 2016/0161823 | A1 | * | 6/2016 | Kim .................. | G02F 1/134309 |
| | | | | | 349/15 |
| 2016/0178965 | A1 | | 6/2016 | Takayama et al. | |
| 2017/0034504 | A1 | * | 2/2017 | Bui ........................ | H04N 13/32 |
| 2017/0168309 | A1 | | 6/2017 | Kasazumi et al. | |
| 2017/0293148 | A1 | * | 10/2017 | Park ..................... | G02B 3/0006 |
| 2018/0239189 | A1 | * | 8/2018 | Koito ................ | G02F 1/133512 |
| 2019/0018244 | A1 | * | 1/2019 | Tan .................... | G02B 27/0172 |
| 2019/0025581 | A1 | | 1/2019 | Nambara | |
| 2019/0339552 | A1 | * | 11/2019 | Gao ...................... | G02F 1/1343 |
| 2022/0373969 | A1 | * | 11/2022 | Smalley ................. | G02B 30/27 |
| 2023/0176393 | A1 | | 6/2023 | Liu et al. | |
| 2023/0386373 | A1 | * | 11/2023 | Benítez ............. | G02B 27/0018 |
| 2024/0027831 | A1 | * | 1/2024 | Nakaoka .......... | G02F 1/133607 |
| 2024/0111159 | A1 | * | 4/2024 | Yang .................... | G02B 27/283 |
| 2024/0231116 | A1 | * | 7/2024 | Bai ........................ | G02B 27/01 |

FOREIGN PATENT DOCUMENTS

| | | | |
|---|---|---|---|
| KR | 10-2016-0068110 | A | 6/2016 |
| KR | 10-2018-0086225 | A | 7/2018 |
| KR | 10-2018-0128249 | A | 12/2018 |

OTHER PUBLICATIONS

Fukano et al., Light field display using virtual imaging mode, 2021.
Fukano et al., Light field display with near virtual-image mode, 2022.

* cited by examiner

-60°   -30°   0°   30°   60°

<div align="center">−60°       −30°       0°       30°       60°</div>

140   141   130    121   120

110

LIGHT FIELD DISPLAY APPARATUS

CROSS-REFERENCE TO RELATED APPLICATION(S)

This application is a continuation application, claiming priority under § 365(c), of an International application No. PCT/KR2024/007740, filed on Jun. 5, 2024, which is based on and claims the benefit of a Korean patent application number 10-2023-0084482, filed on Jun. 29, 2023, in the Korean Intellectual Property Office, and of a Korean patent application number 10-2023-0133772, filed on Oct. 6, 2023, in the Korean Intellectual Property Office, the disclosure of each of which is incorporated by reference herein in its entirety.

TECHNICAL FIELD

The disclosure relates to a light field display having high luminance and a wide viewing angle.

BACKGROUND ART

In general, three-dimensional images are made based on the principle of stereo vision through a person's two eyes, and binocular parallax, which occurs because the two eyes are separated by about 65 mm, may be said to be the most important factor in achieving a stereoscopic effect. Three-dimensional image display apparatuses include glasses-based displays and glasses-free displays, and the glasses-free displays obtain three dimensional (3D) images by separating left and right images from each other without using glasses. The glasses-free displays include a barrier-based method and a lens-based method.

In the barrier-based method, the images that the left and right eyes should respectively see are alternately printed or photographed in a vertical pattern and viewed by using a barrier. By doing this, a vertical pattern image to enter the left eye and a vertical pattern image to enter the right eye are distributed by the barrier, and images from different viewpoints are displayed to the left and right eyes, resulting in a three-dimensional image.

In the lens-based method, images corresponding to the left and right eyes are arranged on a focal plane of a lens, and when the image is observed through the lens, the images are separated into the left and right eyes depending on the directivity characteristics of the lens, forming a three-dimensional shape. Compared to the barrier-based method, the lens-based method has higher light luminance but has a smaller viewing angle, and the barrier-based method has a wider viewing angle but has lower luminance.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a light field display having high luminance and a wide viewing angle.

Additional aspects will be set forth in part in the description which follows and, in part, will be apparent from the description, or may be learned by practice of the presented embodiments.

Technical Solution

In accordance with an aspect of the disclosure, a light field display apparatus is provided. The light field display apparatus includes a display panel configured to emit light that forms an image, a first lens array which is provided in the display panel and in which a plurality of first lenses are arranged, a second lens array which is arranged spaced apart from the first lens array and in which a plurality of second lenses are arranged, a barrier arranged in any one place from among between the display panel and the first lens array, between the first lens array and the second lens array, or in front of the second lens array, wherein the barrier has an aperture that transmits the light.

In accordance with another aspect of the disclosure, a light field display apparatus is provided. The light field display apparatus includes a display panel configured to emit light that forms an image, a first lens array which is provided in the display panel and in which a plurality of first lenses are arranged, a second lens array which is arranged adjacent to the first lens array and in which a plurality of second lenses are arranged, a third lens array which is arranged adjacent to the second lens array and in which a plurality of third lenses are arranged.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

3

Figure 9:
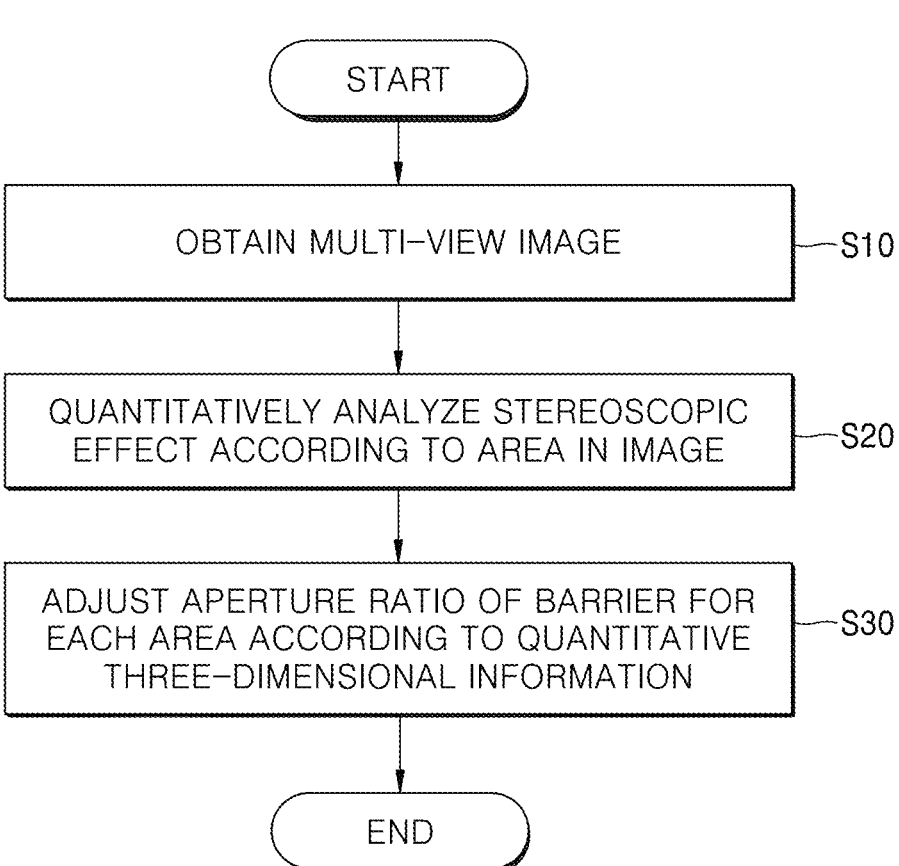
Figure 10:
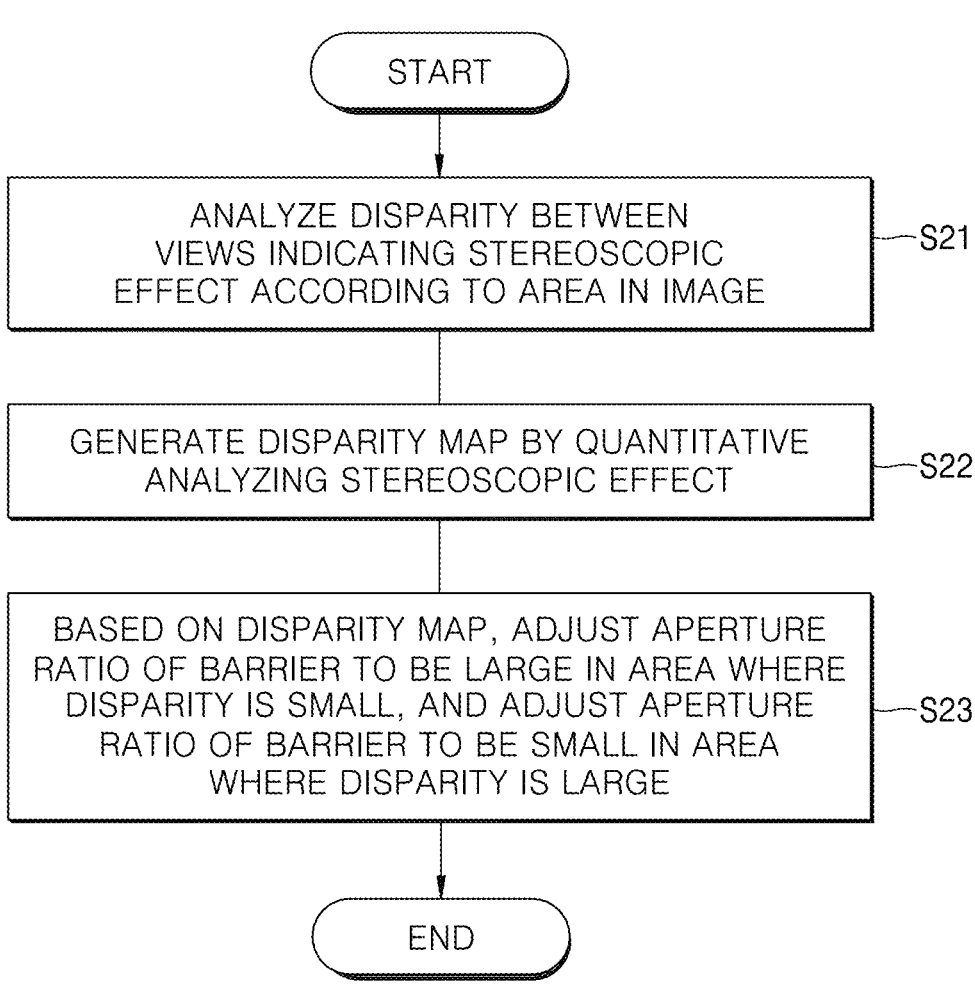
Figure 11:
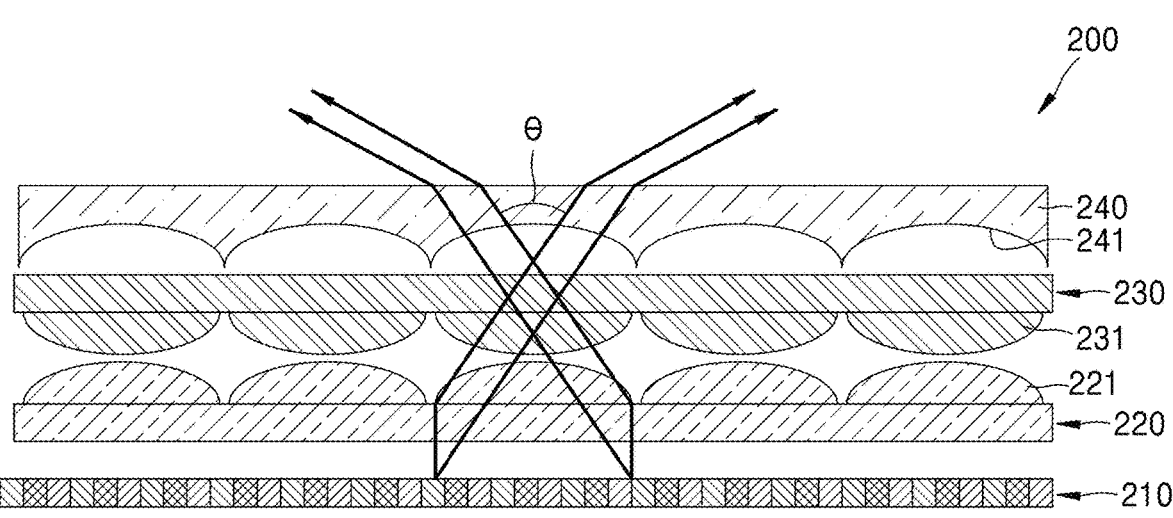
Figure 12:
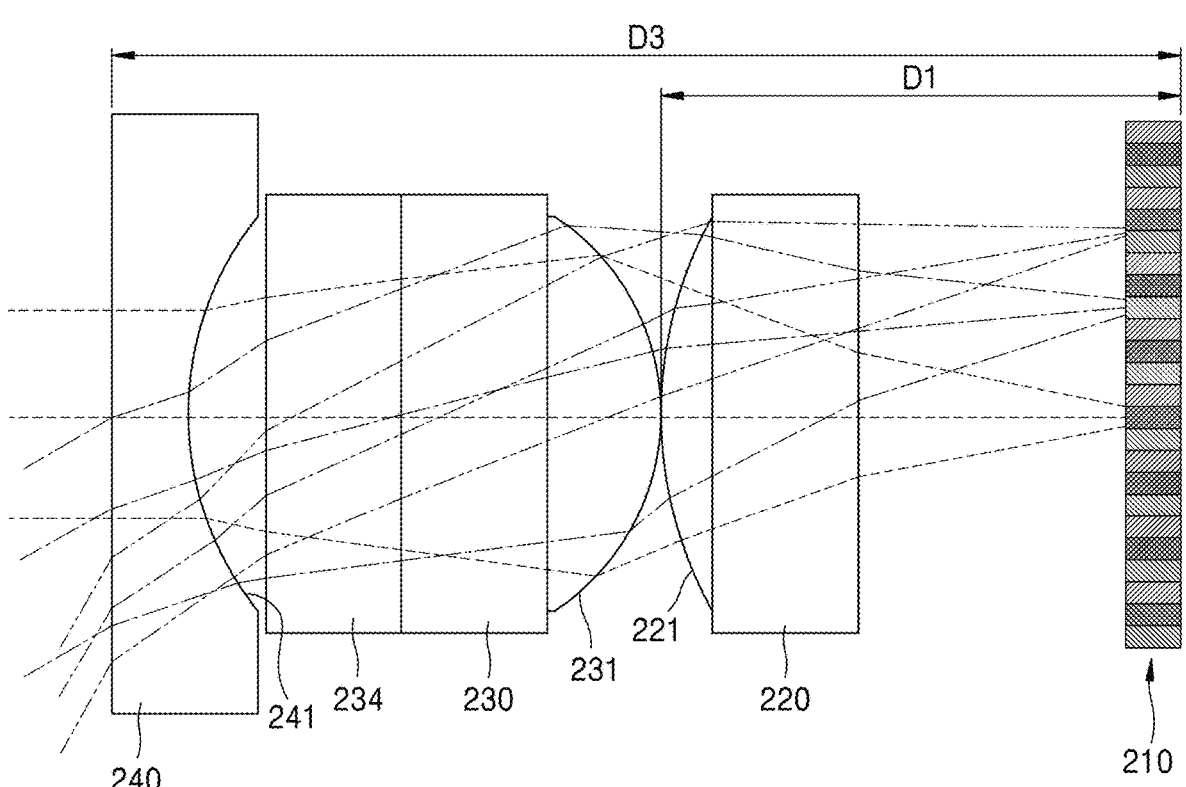
Figure 13:
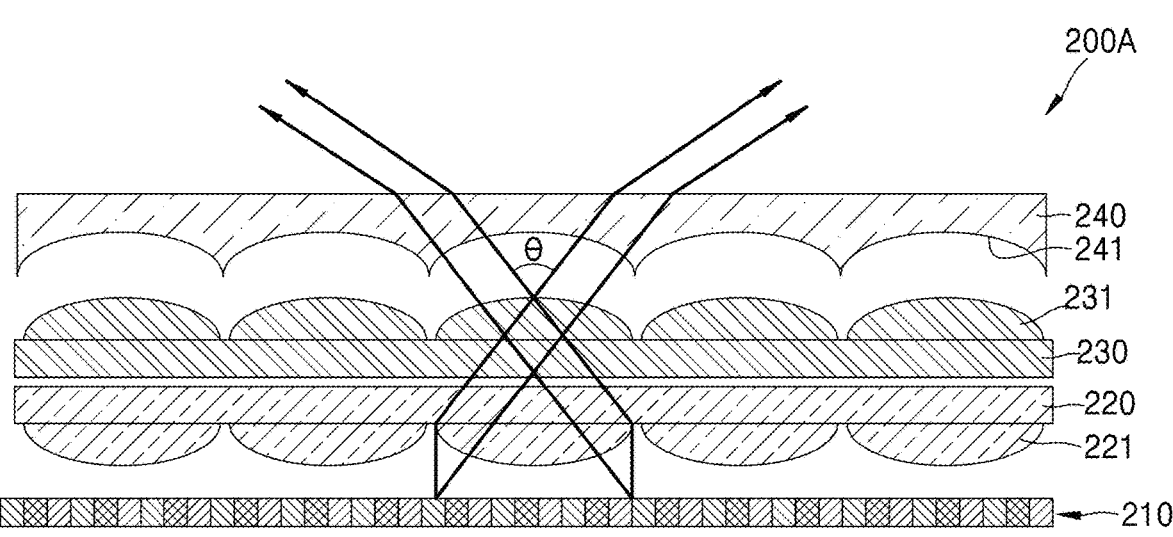
Figure 14:
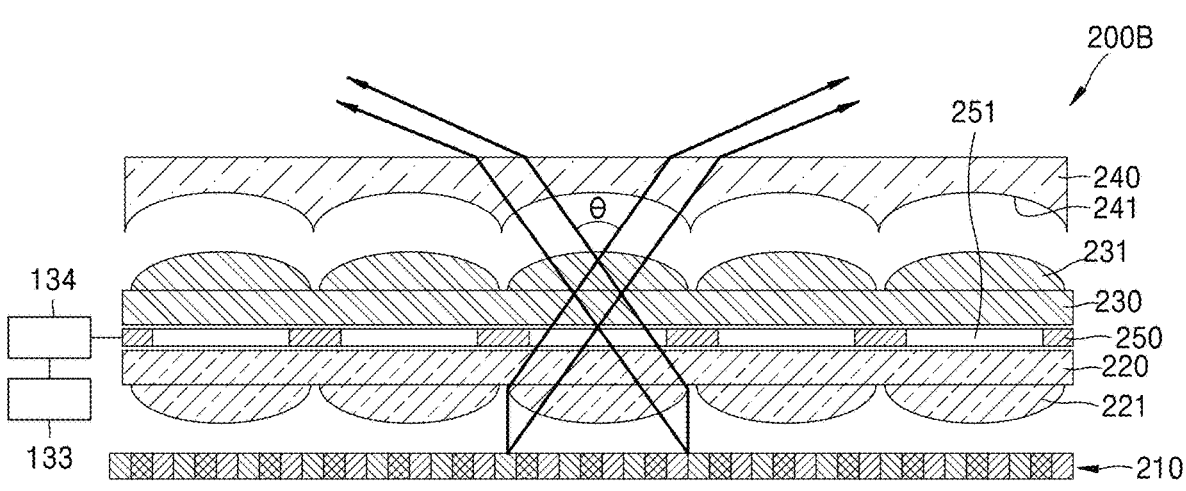

FIGS. 9 and 10 are diagrams for describing a method of adjusting an aperture ratio of a barrier layer in a light field display apparatus, according to various embodiments of the disclosure;

FIG. 11 schematically illustrates a light field display apparatus according to an embodiment of the disclosure;

FIG. 12 is an enlarged view of one lens area of the light field display apparatus shown in FIG. 11 according to an embodiment of the disclosure;

FIG. 13 illustrates an example in which arrangement directions of a first lens and a second lens in the light field display apparatus shown in FIG. 11 are changed according to an embodiment of the disclosure; and FIG. 14 illustrates an example in which a barrier is further provided in the light field display apparatus shown in FIG. 11 according to an embodiment of the disclosure;

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, the same reference numerals denote the same element, and for clarity and convenience of description, a size of each element in the drawings may be exaggerated. While such terms as "first", "second", etc., may be used to describe various elements, such elements must not be limited to the above terms. The above terms are used only to distinguish one element from another element.

In addition, when a part "includes" a certain element, the part may further include another element instead of excluding the other element, unless otherwise stated. In addition, for clarity of description, a size or thickness of each element in the drawings may be exaggerated. In addition, when a certain material layer is described as being present on a substrate or another layer, the material layer may be present in direct contact with a substrate or other layer, or a third layer may be present therebetween. In addition, because materials forming each layer in the following embodiments are examples, other materials may be used.

In addition, the terms such as "unit", "module", and the like used herein indicate a unit for processing at least one function or motion, and the unit and the module may be implemented by hardware or software or by a combination of hardware and software.

Certain executions described in the present embodiment are only an example and do not limit the technical scope in any way. For brevity of the specification, general electronic configurations, control systems, software, and other functional aspects of systems may be omitted. In addition, connections or connection members of lines between elements shown in the drawings are examples of functional connections and/or physical or circuit connections and may be, in actual devices, represented as various functional connections, physical connections, or circuit connections that may be replaced or added.

The use of the article "the" and similar referential terms may refer to both the singular and the plural.

Operations included in a method may be performed in any suitable order unless explicitly stated that they must be performed in the order described. In addition, the use of all example terms (e.g., etc.) is simply for describing the technical idea in detail, and unless limited by the claims, the scope of rights is not limited by these terms.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display drive integrated circuit (IC), an audio CODEC chip, a universal serial bus (USB) controller, a camera controller, an image processing IC, a microprocessor unit (MPU), a system on chip (SoC), an integrated circuit (IC), or the like.

Figure 1:
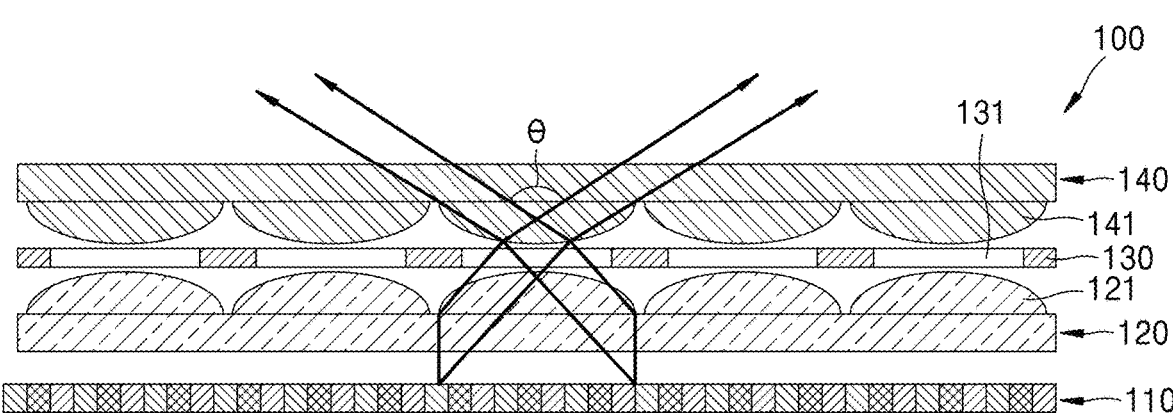
FIG. 1 schematically illustrates a light field display apparatus according to an embodiment of the disclosure.

FIG. 1 illustrates a light field display apparatus according to an embodiment of the disclosure.

Referring to FIG. 1, a light field display apparatus 100 may include a display panel 110 configured to emit light that forms an image, a first lens array 120 which is provided in the display panel 110 and on which a plurality of first lenses 121 are arranged, and a second lens array 140 which is arranged spaced apart from the first lens array and on which a plurality of second lenses 141 are arranged.

The display panel 110 may include a liquid-crystal display (LCD), liquid crystal on silicon (LCoS), an organic light-emitting diode (OLED) display, a light-emitting diode (LED) display, or a projector. The display panel 110 may process an image signal to form a two-dimensional image or a three-dimensional image. Alternatively, the light field display apparatus 110 may include computed generated holography (CGH) to form a hologram image.

The first lens 121 of the first lens array 120 may be a convex lens. In the first lens array 120, the plurality of first lenses 121 may be arranged in a row or in a matrix form. For example, the first lens array 120 is a lenticular lens array or a micro lens array.

The second lens 141 of the second lens array 140 may be a convex lens. In the second lens array 140, the plurality of second lenses 141 may be arranged in a row or in a matrix form. For example, the second lens array 140 is a lenticular lens array or a micro lens array.

The first lens 121 of the first lens array 120 and the second lens 141 of the second lens array 140 may be arranged to face each other. A focal length of the first lens array 120 may be equal to a focal length of the second lens array 140. Alternatively, the focal length of the first lens array 120 may be different from the focal length of the second lens array 140.

The light field display apparatus 100 may include a barrier 130. The barrier 130 may include a plurality of apertures 131. Light emitted from the display panel 110 may travel through the aperture 131. Light transmittance varies depending on the size of the aperture 131, and light crosstalk may therefore be reduced. The barrier 130 may be arranged at one place from among between the display panel 110 and the first lens array 120, between the first lens array 120 and the second lens array 140, and in front of the second lens array 140.

A central axis of curvature of the first lens 121 of the first lens array 120, a central axis of the aperture 131 of the barrier 130, and a central axis of curvature of the second lens 141 of the second lens array 140 may be coincident with each other. The first lens 121, the aperture 131, the second lens 141 may configure one sub-pixel.

Figure 2:
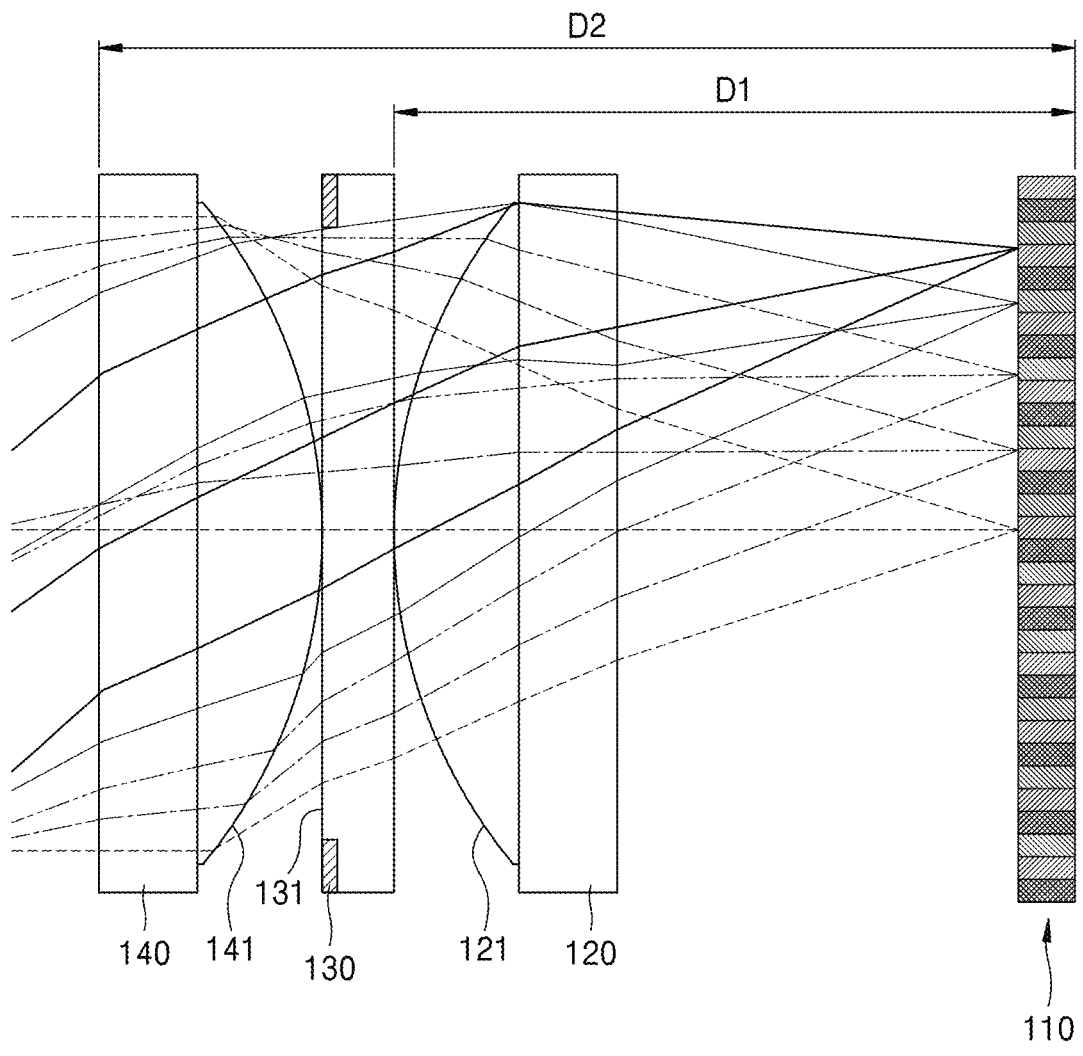
FIG. 2 is an enlarged view of one lens area of the light field display apparatus shown in FIG. 1 according to an embodiment of the disclosure.

FIG. 2 is an enlarged view of a first lens of a first lens array and a second lens of a second lens array according to an embodiment of the disclosure.

Referring to FIG. 2, a distance D1 between the display panel 110 and the first lens 121 of the first lens array 120 may be less than a focal length f1 of the first lens array 120. The display panel 110 may be arranged at a location shorter than the focal length f1 of the first lens array 120 so that image light emitted from the display panel 110 continues to be emitted when the image light passes through the first lens 121, and a divergence angle of light passing through the first lens 121 may be reduced to be smaller than a divergence angle of the light emitted from the display panel 110.

The barrier 130 adjusts the aperture 131 so that crosstalk of light passing through the first lens array 120 may be reduced. In other words, the barrier 130 may adjust a size of the aperture 131 to prevent light rays that cause crosstalk from passing through.

The second lens array 140 may allow light passing through the barrier 130 to become a parallel ray. The parallel ray may represent that an angle of a marginal ray is within 1 degree with respect to a chief ray. As light passing through the second lens array 140 becomes a parallel ray, the viewer may view a three-dimensional image. A distance D2 between the display panel 110 and the second lens array 140 may be substantially equal to a composite focal length of the first lens array 120 and the second lens array 140.

The composite focal length of the first lens array 120 and the second lens array 140 may satisfy the equation shown below.

$$\frac{1}{f} = \frac{1}{f_1} + \frac{1}{f_2} - \frac{a}{f_1 f_2}$$

Equation 1

Here, f indicates a composite focal length of the first lens array 120 and the second lens array 140, f1 indicates a focal length of the first lens array 120, f2 indicates a focal length of the second lens array 140, and a indicates a distance between chief points of the first lens array 120 and the second lens array 140.

When the distance D2 between the second lens array 140 and the display panel 110 is equal to the composite focal length of the first lens array 120 and the second lens array 140, the light emitted from the second lens array 140 may be parallel light. Thereby, a three-dimensional image may be displayed. The light field display apparatus 100 may have a viewing angle θ of 60 degrees or more. By having a wide viewing angle, the viewer may view three-dimensional images from a wide angle.

Figure 3:
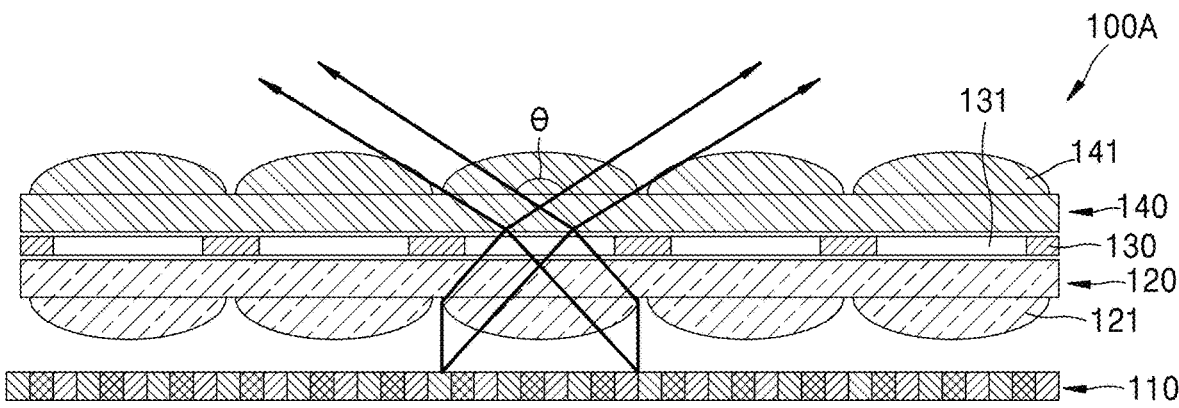
FIG. 3 illustrates an example in which arrangement directions of a first lens and a second lens in the light field display apparatus shown in FIG. 1 are changed according to an embodiment of the disclosure.

FIG. 3 shows an example in which arrangement directions of a first lens array and a second lens array are changed compared to FIG. 1 according to an embodiment of the disclosure.

Referring to FIG. 3, in a light field display apparatus 100A, the first lens 121 of the first lens array 120 may be arranged to face the display panel 110. In addition, the second lens 141 of the second lens array 140 may be arranged symmetrically with the first lens 121. In other words, the second lens 141 of the second lens array 140 may be arranged to face the front of the light field display apparatus 100A.

Figure 4:
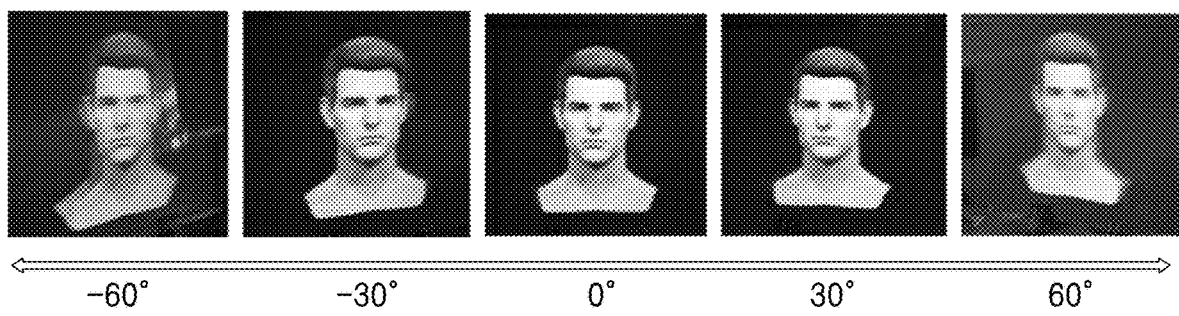
FIG. 4 illustrates images from viewing angles of a light field display apparatus of a comparative example according to an embodiment of the disclosure.

FIG. 4 shows images produced by a lens-based light field display apparatus of a comparative example for viewing angles of −60 degrees, −30 degrees, 0 degrees, 30 degrees, and 60 degrees according to an embodiment of the disclosure.

Referring to FIG. 4, the lens-based light field display apparatus of the comparative example has one lens array. In this case, left and right sides of the image appear inversed at a viewing angle of −60 degrees and 60 degrees. It is difficult for the lens-based light field display apparatus of the comparative example to ensure a viewing angle of more than 60 degrees.

Figure 5:
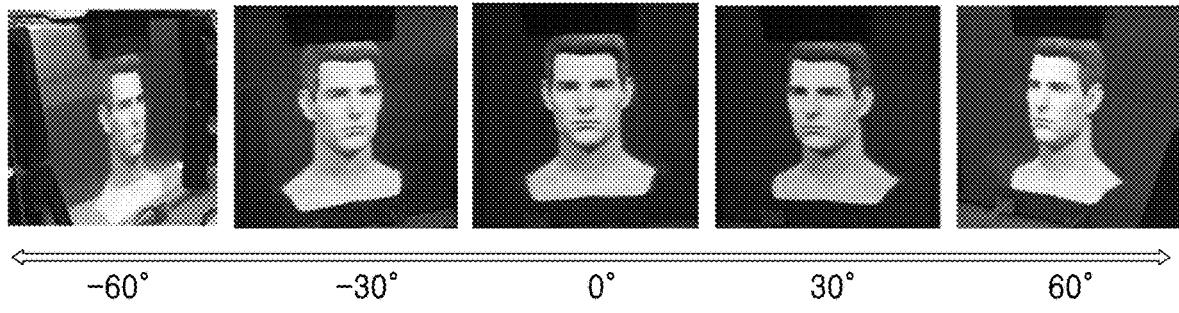
FIG. 5 illustrates images from viewing angles of a light field display apparatus according to an embodiment of the disclosure.

FIG. 5 shows images produced by the light field display apparatus shown in FIG. 1 for viewing angles of −60 degrees, −30 degrees, 0 degrees, 30 degrees, and 60 degrees according to an embodiment of the disclosure.

Referring to FIG. 5, even at a viewing angle of −60 degrees or 60 degrees, the image is displayed three-dimensionally without left or right inversion.

Figure 6:
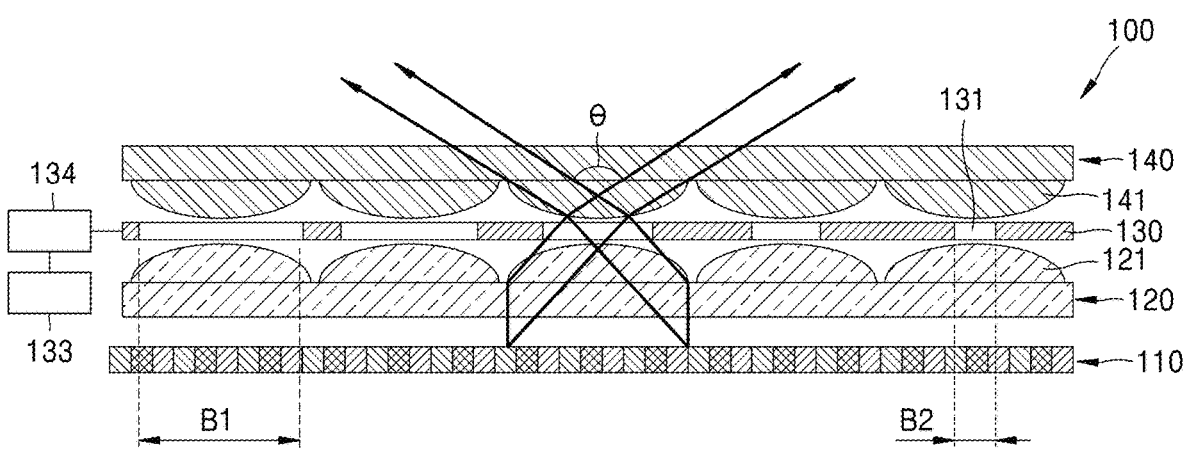
FIG. 6 illustrates an image in which a barrier of a light field display apparatus is configured to be variable, according to an embodiment of the disclosure.

FIG. 6 shows that an aperture of a barrier is variable according to an embodiment of the disclosure.

Referring to FIG. 6, the barrier 130 may be configured to electrically adjust an aperture ratio. The barrier 130 may include a liquid crystal layer. However, the barrier 130 is not limited thereto. For example, referring to FIG. 6, an aperture ratio B1 of the aperture 131 positioned on the left side of the barrier 130 may be adjusted to be greater than an aperture ratio B2 of the aperture 131 positioned on the right side of the barrier 130. The aperture ratio may represent a ratio of an area through which light passes relative to a total area based on one area of a lens. The aperture ratio may be adjusted within the range of 50% to 100%.

Figure 7:
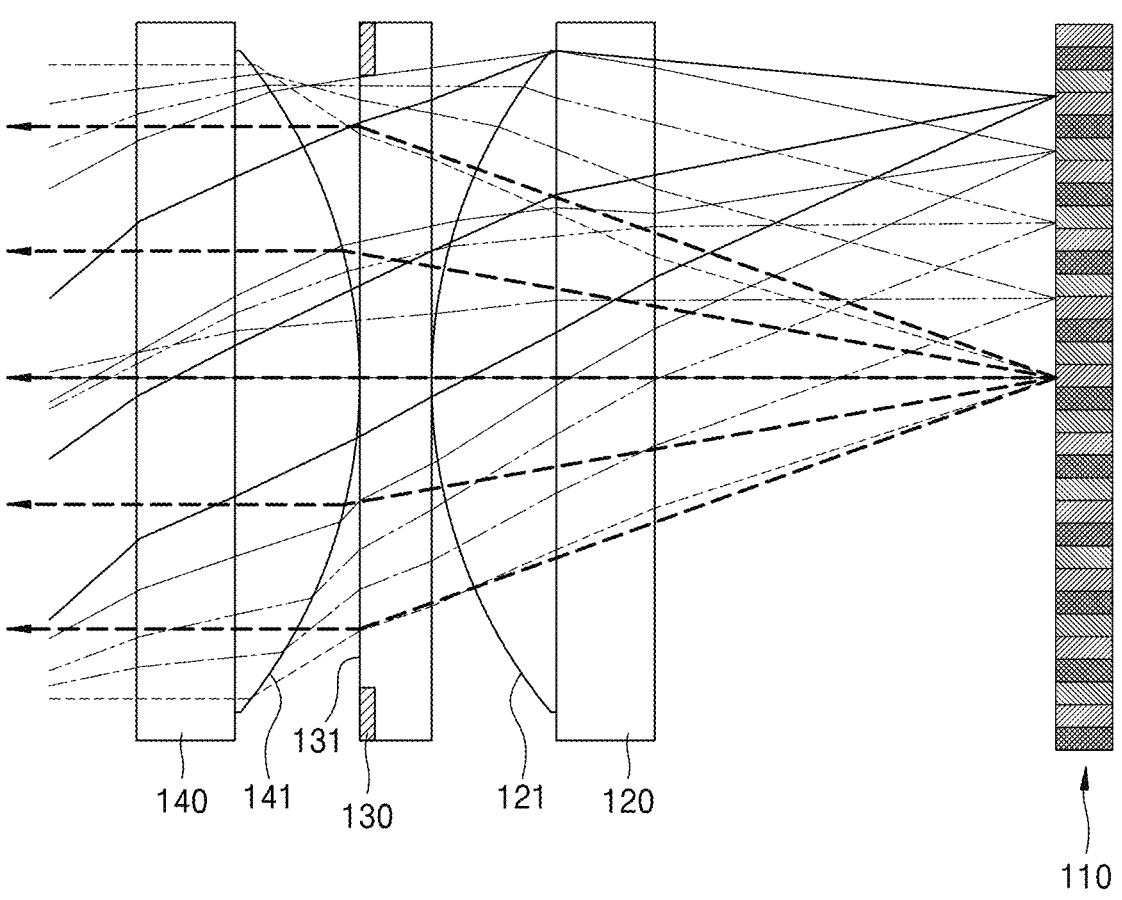
FIG. 7 illustrates an example in which an aperture ratio of a barrier of a light field display apparatus is adjusted to be relatively large, according to an embodiment of the disclosure.

FIG. 7 shows a case in which an aperture ratio of an aperture is relatively large according to an embodiment of the disclosure.

Figure 8:
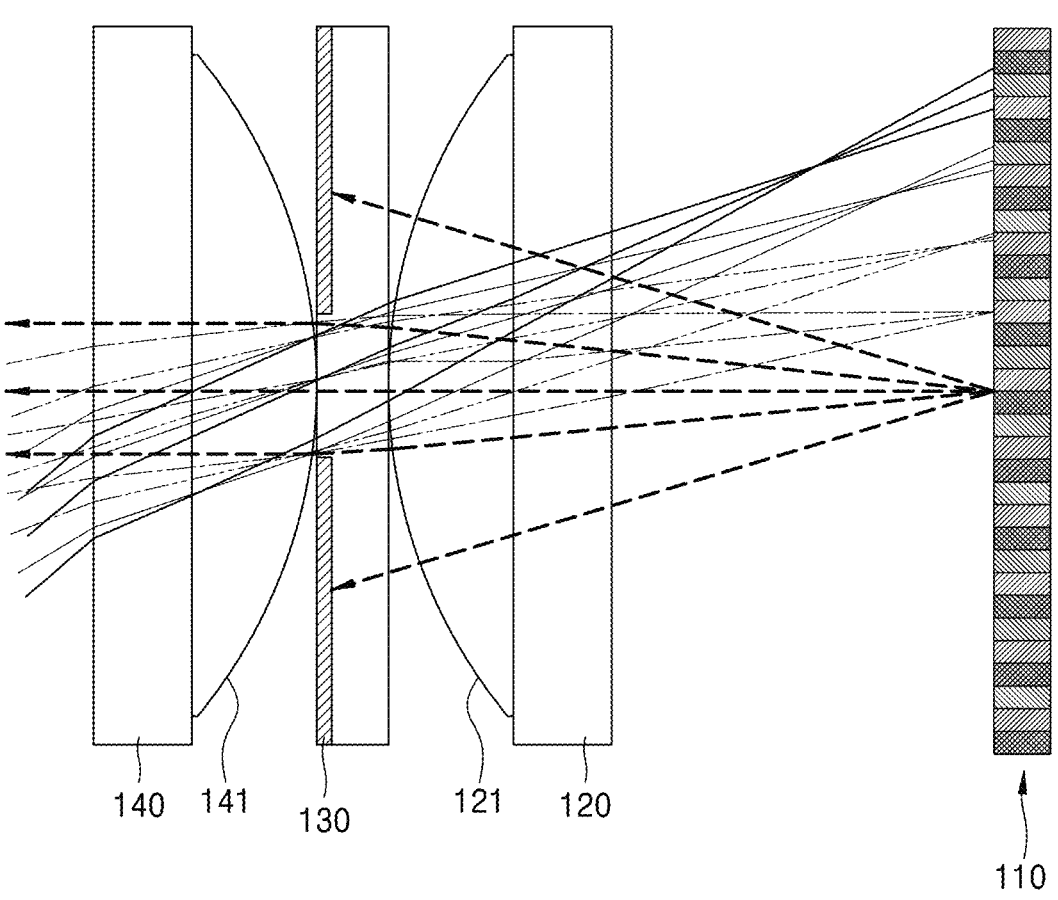
FIG. 8 illustrates an example in which an aperture ratio of a barrier of a light field display apparatus is adjusted to be relatively small, according to an embodiment of the disclosure.

FIG. 8 shows a case in which an aperture ratio of an aperture is relatively small according to an embodiment of the disclosure.

Referring to FIGS. 7 and 8, the aperture ratio of the aperture 131 may be adjusted according to three-dimensional information of an image. In areas of the image where the stereoscopic effect is small, pixel data of different views is similar, and thus, impact of image quality degradation due to crosstalk is small. Therefore, even when the aperture ratio of the aperture 131 is relatively large, side effects due to crosstalk are small, and due to the large aperture ratio, a high-luminance image may be obtained. On the other hand, because sensitivity due to crosstalk is large in areas with large stereoscopic effect in the image, the aperture ratio is adjusted to be relatively small so that crosstalk may be reduced. Thereby, a high-quality image may be displayed in an area with a large stereoscopic effect.

The three-dimensional information may include, for example, disparity between views. An area with a low stereoscopic effect may be an area with a small disparity, and an area with a large stereoscopic effect may be an area with a large disparity.

Referring to FIG. 7, in an area with small disparity, the aperture ratio of the aperture 131 may be increased so that an amount of light passing through the aperture 131 increases, and thus, a high-luminance image may be obtained.

Referring to FIG. 8, in an area with a large disparity, the aperture ratio of the aperture 131 may be reduced so that crosstalk is reduced, and thus, a three-dimensional image of good quality may be provided.

FIGS. 9 and 10 are diagrams for describing a method of adjusting an aperture ratio of a barrier according to various embodiments of the disclosure.

Referring to FIG. 9, a multi-view image for displaying a three-dimensional image is obtained in operation S10. Three-dimensional information may be obtained by quantitatively analyzing a stereoscopic effect according to an area in the image, in operation S20.

Referring to FIG. 6, the light field display apparatus 100 may include an analyzer 133 configured to analyze three-dimensional information, and an aperture ratio adjustment unit 134 configured to adjust an aperture ratio of the barrier 130 according to the three-dimensional information. The analyzer 133 may provide the obtained three-dimensional information to the aperture ratio adjustment unit 134. The aperture ratio adjustment unit 134 may adjust the aperture ratio of the barrier 130 for each area based on the three-dimensional information received from the analyzer 133, in operation S30.

Referring to FIG. 10, the analyzer 133 may analyze a disparity between views indicating a stereoscopic effect according to the area in the image, in operation S21. The analyzer 133 may generate a disparity map by quantitatively analyzing the stereoscopic effect, in operation S22. The analyzer 133 may, based on the disparity map, adjust the aperture ratio of the barrier to be large for areas where the disparity is small, and adjust the aperture ratio of the barrier to be small for areas where the disparity is large, in operation S23.

When a disparity for each area of an image is α, the aperture ratio of the barrier 130 may be expressed as (100–kα). Here, k may be a constant determined by a material of the barrier 130, desired crosstalk, luminance, and the like. By adjusting the aperture ratio of the barrier 130 according to the three-dimensional information in the image, a three-dimensional image with high luminance and high image quality may be provided.

FIG. 11 illustrates a light field display apparatus according to an embodiment of the disclosure.

Referring to FIG. 11, a light field display apparatus 200 may include a display panel 210 configured to emit light that forms an image, a first lens array 220 provided in the display panel 210, a second lens array 230 arranged adjacent to the first lens array 220, and a third lens array 240 arranged adjacent to the second lens array 230.

In the first lens array 220, a plurality of first lenses 221 may be arranged in a row or in a matrix form. The first lens 221 may be a convex lens. The first lens array 220 may be a lenticular lens array or a micro lens array. In the second lens array 230, a plurality of second lenses 231 may be arranged in a row or in a matrix form. The second lens 231 may be a convex lens. The second lens array 230 may be a lenticular lens array or a micro lens array. In the third lens array 333, a plurality of third lenses 241 may be arranged in a row or in a matrix form. The third lens 241 may be a concave lens. The third lens 241 may be a lenticular lens array or a micro lens array.

The first lens array 220 and the second lens array 230 may be arranged so that the first lens 221 and the second lens 231 face each other. The third lens 241 may be arranged so that the concave shape thereof faces the second lens array 230. However, the concave shape of the third lens 241 may be arranged to face away from the second lens array 230. The first lens 221, the second lens 231, and the third lens 241 may be arranged so that central axes of curvature thereof are aligned.

FIG. 12 is an enlarged view of one lens area of the light field display apparatus shown in FIG. 11 according to an embodiment of the disclosure.

Referring to FIG. 12, a distance D1 of the display panel 210 and the first lens array 220 may be less than a focal length of the first lens array 220. Meanwhile, a layer 234 may be further provided between the second lens array 230 and the third lens array 240. The layer 234 is provided to maintain a distance between the second lens array 230 and the third lens array 240 and may include a material having the same refractive index as the second lens array 230.

The first lens array 220 and the second lens array 230 convert image light emitted from the display panel 210 into parallel light, thereby providing images of different vies to the viewer and displaying a three-dimensional image. The third lens array 240 may make an effective focal length thereof shorter than a distance D3 between the display panel 210 and the third lens array 240. The effective focal length may represent a composite focal length by the first lens array 220, the second lens array 230, and the third lens array 240. The composite focal length of the first lens array 220, the second lens array 230, and the third lens array 240 may be shorter than the distance D3 between the display panel 210 and the third lens array 240. In addition, the composite focal length by the first lens array 220, the second lens array 230, and the third lens array 240 may be shorter than a composite focal length of the first lens array 220 and the second lens array 230. Thereby, a lens array having a short focal length may be used, which means a high lens per inch (LPI) lens may be used, and thus, the resolution of the light field display apparatus may be increased. The focal length of the first lens array 220 may be identical to or different from a focal length of the second lens array 230.

FIG. 13 shows that arrangement directions of a first lens array and a second lens array 230 changed compared to the light field display apparatus shown in FIG. 11 according to an embodiment of the disclosure. Elements using the same reference numerals in FIG. 13 as those in FIG. 11 are substantially the same elements, and detailed descriptions thereof are omitted.

Referring to FIG. 13, in a light field display apparatus 200A, the first lens 221 of the first lens array 220 may be arranged to face the display panel 210. In addition, the second lens 231 of the second lens array 230 may be arranged symmetrically with the first lens 221. In other words, the second lens 231 of the second lens array 230 may be arranged to face the front of the light field display apparatus 200A. Even with this arrangement, the light field display apparatus 200A may have the same effect as the light field display apparatus 200.

FIG. 14 shows an example in which a barrier is further provided in the light field display apparatus shown in FIG. 13 according to an embodiment of the disclosure.

Referring to FIG. 14, A light field display apparatus 200B may include a barrier 250 between the first lens array 220 and the second lens array 230. The barrier 250 may include a plurality of apertures 251. The barrier 250 may adjust an aperture ratio of the aperture 251. The light field display apparatus 200B may include an analyzer 133 configured to analyze three-dimensional information of an image, and an aperture ratio adjustment unit 134 configured to adjust an aperture ratio of the barrier according to the three-dimensional information. The analyzer 133 and the aperture ratio adjustment unit 134 are as described with reference to FIG. 6, and detailed descriptions thereof are omitted herein.

As described above, in the disclosure, a wide viewing angle of 60 degrees or more may be ensured, and a high-luminance three-dimensional image may be displayed. Therefore, the user may enjoy high-quality three-dimensional images in a wide viewing angle range.

An embodiment of the disclosure may provide a light field display having high luminance and a wide viewing angle.

A light field display apparatus according to an embodiment of the disclosure includes a display panel configured to emit light that forms an image, a first lens array which is provided in the display panel and in which a plurality of first lenses are arranged, a second lens array which is arranged spaced apart from the first lens array and in which a plurality of second lenses are arranged, a barrier arranged in any one place from among between the display panel and the first lens array, between the first lens array and the second lens array, or in front of the second lens array, wherein the barrier has an aperture that transmits the light.

A distance between the display panel and the first lens array is less than a focal length of the first lens array.

A distance between the display panel and the second lens array is equal to a composite focal length of the first lens array and the second lens array.

The composite focal length of the first lens array and the second lens array satisfies the equation shown below:

$$\frac{1}{f} = \frac{1}{f_1} + \frac{1}{f_2} - \frac{a}{f_1 f_2},$$

where f indicates a composite focal length of the first lens array and the second lens array, f1 indicates a focal length of the first lens array, f2 indicates a focal length of the second lens array, and a indicates a distance between main points of the first lens array and the second lens array.

The barrier is configured to electrically adjust an aperture ratio.

The light field display apparatus further includes an analyzer configured to analyze three-dimensional information of the image, and an aperture ratio control unit configured to adjust the aperture ratio of the barrier according to the three-dimensional information received from the analyzer.

The three-dimensional information includes a disparity map.

A first lens of the first lens array and a second lens of the second lens array is convex lenses, and the first lens and the second lens are arranged to face each other.

The first lens of the first lens array and the second lens of the second lens array are convex lenses, wherein the first lens may be arranged to face the display panel, and the second lens may be arranged symmetrically with the first lens.

A light field display apparatus according to an embodiment of the disclosure includes a display panel configured to emit light that forms an image, a first lens array which is provided in the display panel and in which a plurality of first lenses are arranged, a second lens array which is arranged adjacent to the first lens array and in which a plurality of second lenses are arranged, a third lens array which is arranged adjacent to the second lens array and in which a plurality of third lenses are arranged.

The first lens of the first lens array is a convex lens, the second lens of the second lens array is a convex lens, and the third lens of the third lens array is a concave lens.

The third lens of the third lens array is arranged to face the display panel.

The composite focal length of the first lens array, the second lens array, and the third lens array is less than a distance between the display panel and the third lens array, and has an aperture that transmits the light.

The barrier is configured to electrically adjust an aperture ratio.

The light field display further includes an analyzer configured to analyze three-dimensional information of the image, and an aperture ratio control unit configured to adjust an aperture ratio of the barrier according to the three-dimensional information received from the analyzer.

The three-dimensional information comprises a disparity map.

Each of the first lenses and the first lens array and each of the second lenses of the second lens array are convex lenses, and the first lenses and the second lenses are arranged to face each other.

Each of the first lenses of the first lens array and each of the second lenses of the second lens array are convex lenses, and the first lenses are arranged to face the display panel, and the second lenses are arranged symmetrically with the first lenses.

The first lens array has a first lens arranged to face the display panel.

The second lens array has a second lens array arranged symmetrically with the first lens.

The second lens of the second lens array faces the front of the light field display apparatus.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A light field display apparatus comprising:
   a display panel configured to emit light that forms an image;
   a first lens array which is provided in the display panel and in which a plurality of first lenses are arranged;
   a second lens array which is arranged spaced apart from the first lens array and in which a plurality of second lenses are arranged; and a barrier arranged in any one place from among:
  between the display panel and the first lens array,
  between the first lens array and the second lens array,
    or
  in front of the second lens array,
wherein the barrier has an aperture that transmits the light,
wherein each of the first lenses of the first lens array and
    each of the second lenses of the second lens array are
    convex lenses having a same focal length,
wherein the first lenses are arranged to face in a first
    direction and the second lenses are arranged to face in
    a second direction opposite to the first direction, and
wherein a central axis of the aperture of the barrier, a
    central axis of curvature of a first lens of the first lens
    array, and a central axis of curvature of a second lens
    of the second lens array are coincident with each other.

2. The light field display apparatus of claim 1, wherein a
distance between the display panel and the first lens array is
less than a focal length of the first lens array.

3. The light field display apparatus of claim 1, wherein a
distance between the display panel and the second lens array
is equal to a composite focal length of the first lens array and
the second lens array.

4. The light field display apparatus of claim 3, wherein the
composite focal length of the first lens array and the second
lens array satisfies an equation shown below:

$$\frac{1}{f} = \frac{1}{f_1} + \frac{1}{f_2} - \frac{a}{f_1 f_2},$$

where f indicates the composite focal length of the first
    lens array and the second lens array, f1 indicates a focal
    length of the first lens array, f2 indicates a focal length
    of the second lens array, and a indicates a distance
    between main points of the first lens array and the
    second lens array.

5. The light field display apparatus of claim 1, wherein the
barrier is configured to electrically adjust an aperture ratio.

6. The light field display apparatus of claim 1, further
comprising:
  an analyzer configured to analyze three-dimensional
    information of the image; and
  an aperture ratio control unit configured to adjust an
    aperture ratio of the barrier according to the three-
    dimensional information received from the analyzer.

7. The light field display apparatus of claim 6, wherein the
three-dimensional information comprises a disparity map.

8. The light field display apparatus of claim 1,
wherein the first lenses and the second lenses are arranged
    to face each other.

9. The light field display apparatus of claim 1,
wherein each of the first lenses is arranged to face the
    display panel and each of the second lenses is arranged
    symmetrically with the first lenses.

10. A light field display apparatus comprising:
a display panel configured to emit light that forms an
    image;
a first lens array which is provided in the display panel
    and in which a plurality of first lenses are arranged;
a second lens array which is arranged adjacent to the first
    lens array and in which a plurality of second lenses are
    arranged;

a third lens array which is arranged adjacent to the second
    lens array and in which a plurality of third lenses are
    arranged; and
a barrier which is arranged in any one place from among
    between the display panel and the first lens array,
    between the first lens array and the second lens array,
    and between the second lens array and the third lens
    array, and has an aperture that transmits the light,
wherein each of the first lenses of the first lens array and
    each of the second lenses of the second lens array are
    convex lenses having a same focal length,
wherein the first lenses are arranged to face in a first
    direction and the second lenses are arranged to face in
    a second direction opposite to the first direction, and
wherein a central axis of the aperture of the barrier, a
    central axis of curvature of a first lens of the first lens
    array, and a central axis of curvature of a second lens
    of the second lens array are coincident with each other.

11. The light field display apparatus of claim 10,
wherein each of the second lenses of the second lens array
    is a convex lens, and
wherein each of the third lenses of the third lens array is
    a concave lens.

12. The light field display apparatus of claim 11, wherein
the third lenses of the third lens array are arranged to face the
display panel.

13. The light field display apparatus of claim 10, wherein
a distance between the display panel and the first lens array
is less than a focal length of the first lens array.

14. The light field display apparatus of claim 10, wherein
a composite focal length of the first lens array, the second
lens array, and the third lens array is less than a distance
between the display panel and the third lens array.

15. The light field display apparatus of claim 10, wherein
the barrier is configured to electrically adjust an aperture
ratio.

16. The light field display apparatus of claim 15, further
comprising:
  an analyzer configured to analyze three-dimensional
    information of the image; and
  an aperture ratio control unit configured to adjust an
    aperture ratio of the barrier according to the three-
    dimensional information received from the analyzer.

17. The light field display apparatus of claim 16, wherein
the three-dimensional information comprises a disparity
map.

18. The light field display apparatus of claim 10,
wherein each of the first lenses and the first lens array and
    each of the second lenses of the second lens array are
    convex lenses, and
wherein the first lenses and the second lenses are arranged
    to face each other.

19. The light field display apparatus of claim 10,
wherein each of the first lenses of the first lens array and
    each of the second lenses of the second lens array are
    convex lenses, and the first lenses are arranged to face
    the display panel, and
wherein the second lenses are arranged symmetrically
    with the first lenses.

20. The light field display apparatus of claim 15, wherein
the aperture ratio is adjustable within a range of 50% to
100%.

* * * * *